United States Patent Office 3,839,587
Patented Oct. 1, 1974

3,839,587
METHOD FOR EFFECTING INCREASED BILE FLOW COMPRISING ORALLY ADMINISTERING CHOLERETIC MEDICAMENTS CONTAINING 1-PHENOXY-3-ALKOXY-PROPANOLS
Hans Hoffmann, Inzlingen, Josef Wagner, Munich, and Gernot Hofrichter and Helmut Grill, Vasterstetten, Germany, assignors to Chemisch-Pharmazeutische Fabrik Adolf Klinge & Co., Munich, Germany
No Drawing. Filed Apr. 24, 1972, Ser. No. 246,598
Claims priority, application Germany, Feb. 16, 1971, P 22 07 254.4; Apr. 27, 1971, P 21 20 396.3
Int. Cl. A61k 27/00
U.S. Cl. 424—341          2 Claims

ABSTRACT OF THE DISCLOSURE

Phenol ether compounds, with a substituted phenoxy radical, namely 1-phenoxy-3-alkoxy-propanols, are found to be useful pharmaceuticals possessing a strong choleretic effect in low dosage.

SPECIFICATION

The present invention relates to phenoxy substituted phenol ether compounds useful as medicaments and, more particularly, to 1-phenoxy-3-alkoxy-propanols useful as choleretic pharmaceuticals.

Certain phenol ether compounds included under the general formula

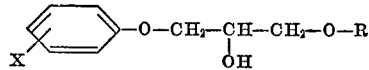

wherein R is a lower alkyl group, straight or branched, saturated or unsaturated, and wherein X is hydrogen, a lower alkyl, a lower alkoxy or chlorine, have been known for some time. Thus, the preparation of such 1-phenyl-3-alkyl-propanetriol ethers is described in Chemisches Zentralblatt, Vol. I, page 1134 (1910) as well as in Swiss patent 228,336 and U.S. Pat. 2,343,053. According to these prior disclosures, the compounds are formed through an addition reaction during the heating of aryl glycidyl ethers with alcohols. The presence of triphenyl phosphine or boron trifluoride etherate catalyzes this reaction, as disclosed in German DOS 1,543,884 and the Journal of Polymer Science, Part A.3, page 2955 (1965).

It is also known that these ether compounds can be prepared through the reaction of 2-hydroxy-3-aryloxy-propylchloridene with alcoholates or through the reaction of 2-hydroxy-3-alkoxypropylchloridene with phenolates, noting Swiss Pat. 228,336 and U.S. Pats. 2,351,024 and 2,351,025, which also show the formation of the glycidyl ether followed by its reaction with the alcoholate or phenolate.

While the prior art as indicated above has shown the production of certain of such compounds, the use of such compounds has, until the present time, been basically in the synthetic resin industry, more particularly in the preparation of epoxy resins, as in DOS 1,543,884 and also as solvents for nitrocellulose. No pharmaceutical utility has previously been suggested. Unexpectedly, it has now been found that such phenol ether compounds, wherein the phenoxy radical may be substituted in a given case singly or doubly with certain substituents, possess a strong choleretic effect even when used in relatively low dosage amounts.

Accordingly, the present invention relates to novel medicament or pharmaceutical compositions and to the new choleretic usage of such compositions which contain an effective choleretic quantity of a compound of the formula

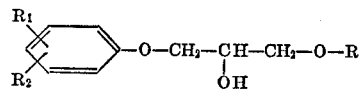

wherein R is a lower alkyl or alkylene radical of 1–6 carbon atoms and $R_1$ and $R_2$ are each hydrogen, methyl, trifluoromethyl, methoxy, ethoxy, chlorine or fluorine and wherein $R_1$ and $R_2$ are at the ortho, meta or para position. The invention also relates to certain new compounds within the above group, as delineated below.

The active choleretic compounds of the present invention are colorless, viscous, higher-boiling liquids which can be mixed in the customary manner with pharmaceutical diluents, excipients or carriers. In the following tables, there are listed 49 examples of the active compounds in accordance with the present invention, as well as their boiling points, each of the 49 examples corresponding to the above formula and possessing choleretic activity. The compounds of Table I below as well as compounds 44–49 of the Table II below each have no more than one substituent on the phenoxy radical, while the remainder of the compounds, namely compounds 31–43, set forth in Table II have two substituents on the phenoxy radical.

TABLE I
1-phenoxy-3-alkoxy-propanol-(2)

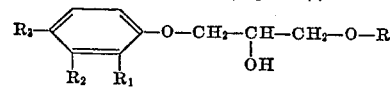

| Compound number | Substituents | | | | Boiling point, °C./mm. |
|---|---|---|---|---|---|
| | $R_3$ | $R_2$ | $R_1$ | R | |
| 1 | H | H | H | Methyl | 95/0.3 |
| 2 | H | H | H | Ethyl | 104/0.2 |
| 3 | H | H | H | n-Propyl | 121/0.2 |
| 4 | H | H | H | Allyl | 108/0.3 |
| 5 | H | H | H | iso-Propyl | 102/0.3 |
| 6 | H | H | H | n-Butyl | 165/11 |
| 7 | H | H | H | n-Pentyl | 131/0.07 |
| 8 | H | H | H | n-Hexyl | 142/0.07 |
| 9 | H | H | Methyl | Methyl | 155/12 |
| 10 | H | H | do | Ethyl | 157/10 |
| 11 | H | Methyl | H | Methyl | 188/19 |
| 12 | H | do | H | Ethyl | 163/11 |
| 13 | H | do | H | Allyl | 115/0.07 |
| 14 | H | do | H | Butyl | 127/0.07 |
| 15 | Methyl | H | H | Methyl | 158/12 |
| 16 | do | H | H | Ethyl | 161/10 |
| 17 | H | H | Methoxy | Methyl | 171/10 |
| 18 | H | Methoxy | H | do | 131/0.06 |
| 19 | Methoxy | H | H | do | 109/0.05 |
| 20 | do | H | H | Ethyl | 112/0.05 |
| 21 | do | H | H | n-Propyl | 132/0.1 |
| 22 | do | H | H | Allyl | 119/0.05 |
| 23 | do | H | H | iso-Propyl | 127/0.2 |
| 24 | do | H | H | n-Butyl | 140/0.05 |
| 25 | do | H | H | n-Pentyl | 159/0.07 |
| 26 | do | H | H | n-Hexyl | 154/0.06 |
| 27 | Ethoxyl | H | H | Methyl | 128/0.2 |
| 28 | H | H | Chlorine | do | 168/11 |
| 29 | H | Chlorine | H | do | 170/11 |
| 30 | Chlorine | H | H | do | 169/12 |

TABLE II 1-phenoxy-3-alkoxy-propanol-(2)

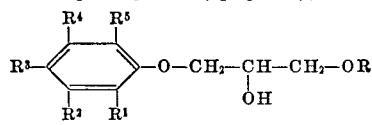

| Compound number | Substituents | | | | | | Boiling point, °C./mm. |
|---|---|---|---|---|---|---|---|
| | R¹ | R² | R³ | R⁴ | R⁵ | R | |
| 31 | H | Methyl | Methyl | H | H | Methyl | 107/0.007 |
| 32 | H | do | do | H | H | Ethyl | 119/0.008 |
| 33 | H | do | H | Methyl | H | Methyl | 127/0.09 |
| 34 | H | do | H | do | H | Ethyl | 121/0.2 |
| 35 | H | do | Chlorine | H | H | Methyl | 124/0.06 |
| 36 | H | do | do | H | H | Butyl | 163/0.09 |
| 37 | Methyl | H | H | H | Chlorine | Methyl | 111/0.065 |
| 38 | do | H | H | H | do | Butyl | 134/0.065 |
| 39 | H | Chlorine | Chlorine | H | H | Methyl | 129/0.06 |
| 40 | H | do | do | H | H | Butyl | 156/0.008 |
| 41 | Chlorine | H | H | H | Chlorine | Methyl | 109/0.07 |
| 42 | do | H | H | H | do | Butyl | 132/0.06 |
| 43 | H | Methoxy | H | Methoxy | H | Methyl | 147/0.05 |
| 44 | H | H | Fluorine | H | H | do | 115/0.09 |
| 45 | H | H | do | H | H | Butyl | 124/0.07 |
| 46 | H | H | do | H | H | Allyl | 80/0.03 |
| 47 | Trifluoromethyl | H | H | H | H | Methyl | 140/10 |
| 48 | do | H | H | H | H | Allyl | 138/10 |
| 49 | Fluorine | H | H | H | H | Hexyl | 132/0.01 |

The novel compounds of the present invention are shown in Table II above and correspond to the above formula wherein $R_1$ and $R_2$ are the same or different and are selected from methyl, methoxy and chlorine. In addition the substituent R, i.e. the lower alkyl or alkylene ether group, should possess preferably no more than 4 carbon atoms. An extenison of the alkyl ether group to 5 or 6 carbon atoms with simultaneous double substitution on the phenoxy radical leads to a highly lipophylic compound, tending to reduce the choleretic effect. Other novel compounds in Table II are only singly substituted on the phenyl radical with fluorine or trifluoromethyl.

The active compounds of the present invention, including the novel compounds of Table II above, can be prepared by several known methods. For example, such compounds may be prepared by reacting a 3-alkoxy-1-chloropropanol of the formula $Cl-CH_2-CHOH-CH_2OR$, wherein R is a lower alkyl or alkylene radical of 1–6 carbon atoms, with a phenolate of the formula

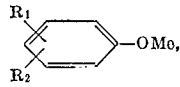

wherein $R_1$ and $R_2$ are hydrogen, methyl, trifluoromethyl, methoxy, ethoxy, chlorine or fluorine; and Me is an alkali metal or ammonium. Or a 1-phenoxy-3-chloropropanol of the formula

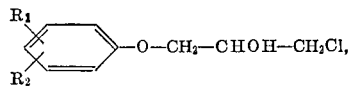

may be reacted with an alcoholate of the formula MeOR, wherein $R_1$, $R_2$, Me and R have the meanings given above.

In the above reactions known solvents may be used, for example, aromatic hydrocarbons or aliphatic alcohols. The corresponding glycidyl ethers are formed initially in accordance with the above reactions and these glycidyl ethers can then be readily converted with the desired reagent to form the desired end product. In many cases, it is equally suitable to initially isolate the glycidyl ether and then perform the additional reaction in an alkaline medium with the corresponding alcohol or substituted phenol.

The 3-alkoxy-1-chloropanols-(2) required for the preparation of the alkyl glycidyl ethers can be obtained through the acid catalyzed reaction of epichlorohydrin with alcohol, while the 1-phenoxy-3-chloropanols-(2) can be obtained through the alkaline catalyzed reaction of epichlorohyrin with phenol.

To determine the pharmacological activity of the compounds used in the present invention, rats were employed as test animals. The series of tests conducted showed that the compounds provide a strong cholagogic effect even at low doses. The pharmacological tests were performed as follows:

Male and female Sprague-Dawley rats, weighing 240–260 grams, maintained under standard conditions and without food for sixteen hours prior to the beginning of the tests, were narcotized with 1.2 grams of ethyl urethane per kilogram of body weight, i.p. The abdominal cavity of each rat was opened medially, the duodenum was stretched out in front and a thin PVC catheter (inner diameter 0.4 mm. outer diameter 0.95 mm., length 120 mm.) was bound into the ductus choledochus. For the application of the active substances, a second, shorter and thicker PVC hose was bound into the duodenum, distally in relation to Papilla Vateri. After the intestine was placed back into its position, the abdominal wall was closed by means of Herff's clamps. In order to maintain the normal body temperature of the animals as much as possible during the experiment, the rats were placed on a special, thermostatically heated table.

Ninety minutes after the operation, i.e., after the stabilization of the bile flow, the secreted bile was collected in small tared glass cups and the moisture content was determined at intervals of 30 minutes over the duration of experiment amounting to at least 3 hours. The active substances were applied intraduodenally as 2.5, 5 and 10% emulsion in a 0.25% aqueous agar solution and in quantity of 0.1 ml./100 g. body weight. The control animals obtained only the corresponding amount of the agar solution. The percentage increase of bile secretion in relation to the untreated control animals over a three-hour period was calculated separately for every dose group. At least 6 animals were employed for every dose and control group.

For the determination of the average lethal dosage ($LD_{50}$) of the experimental substances, male and female NMRI mice, weighing 16–19 g. and kept without food were employed. The experimental substances were applied likewise as an emulsion in a 0.25% aqueous agar solution through esophagus probes. The observation period amounted to nine days, and at least 5 dose groups were employed for every experimental substance, the groups containing 10 animals in each case.

The results of the pharmacological tests dealing with 37 of the compounds listed in Tables I and II are shown in the Table III. The choleretic compound 2-[(6-chloro-3-pyridazinyl)-thio]-N,N-diethylacetamide, i.e. Oragallin, described in Arzneimittelforschung, Vol. 14, page 266 (1964) and effectively used in medical practice, was employed as a comparative compound; in the following table, Oragallin is designated as $X^{23}$.

TABLE III

| Compound number | Percent increase (3 hours) | | | ED (50%), mg./kg. | LD$_{50}$ mice (control limits), mg./kg. |
|---|---|---|---|---|---|
| | 25% | 50% | 100% | | |
| | Mg./kg. | | | | |
| 1 | 24 | 49 | 93 | 46 | 1,400 (1,228–1,596) |
| 2 | 12 | 31 | 82 | 60 | 1,210 (976–1,500) |
| 3 | 33 | 51 | 81 | 46 | 2,000 (1,724–2,320) |
| 4 | 40 | 53 | 113 | 38 | 1,310 (1,149–1,493) |
| 5 | 28 | 39 | 89 | 49 | 1,750 (1,483–2,065) |
| 6 | 21 | 42 | 87 | 51 | 3,050 (2,584–3,599) |
| 7 | 39 | 50 | 83 | 43 | >3,000 |
| 9 | 27 | 41 | 84 | 51 | 920 (814–1,040) |
| 10 | 21 | 43 | 86 | 50 | 1,290 (1,136–1,464) |
| 11 | 35 | 49 | 84 | 43 | 1,350 (1,184–1,539) |
| 12 | 28 | 43 | 83 | 51 | 2,280 (1,948–2,667) |
| 15 | 16 | 29 | 58 | 80 | 1,440 (1,241–1,763) |
| 16 | 18 | 34 | 78 | 58 | 1,700 (1,417–2,040) |
| 17 | 24 | 45 | 91 | 47 | 1,100 (940–1,287) |
| 18 | 24 | 39 | 72 | 58 | 1,445 (1,290–1,618) |
| 19 | 7 | 27 | 64 | 74 | 1,290 (1,151–1,446) |
| 21 | 18 | 36 | 56 | 82 | 2,200 (1,849–2,618) |
| 22 | 13 | 62 | 77 | 50 | 1,753 (1,458–2,065) |
| 23 | 30 | 55 | 92 | 41 | 2,000 (1,724–2,320) |
| 24 | 27 | 45 | 80 | 52 | >3,000 |
| 25 | 37 | 50 | 80 | 45 | 3,500 (2,573–4,760) |
| 28 | 26 | 41 | 96 | 47 | 1,300 (1,083–1,560) |
| 29 | 14 | 36 | 81 | 55 | 1,420 (1,224–1,647) |
| 30 | 15 | 27 | 63 | 73 | 1,040 (881–1,227) |
| 33 | | | 43 | | 1,625 (1,371–1,925) |
| 34 | | | 42 | | 1,590 (1,325–1,908) |
| 35 | | | 46 | | 1,875 (1,630–2,156) |
| 36 | | | 37 | | 3,000 |
| 38 | | | 38 | | 3,000 |
| 39 | | | 26 | | 1,310 (1,128–1,521) |
| 41 | | | 27 | | 965 (619–1,505) |
| 42 | | | 33 | | 3,000 |
| 43 | | | 42 | | 1,330 (1,118–1,583) |
| 44 | | | 50 | | 1,100 (1,004–1,206) |
| 45 | | | 43 | | 2,650 (2,294–3,060) |
| 46 | | | 48 | | 1,400 (1,186–1,652) |
| 48 | | | 26 | | 2,730 (1,964–3,795) |
| X23 | 22 | 21 | 44 | 130 | 1,150 (1,008–1,311) |

The results shown in Table III clearly indicate that the compounds of the invention are distinctly superior in choleretic effect and, for the most part, also in tolerance in relation to Oragallin, a choleretic compound that has attained a good degree of acceptance in the field.

For oral administration a single daily dose of 10–200 mg. of the active substance is sufficient. The active compounds are suitable worked directly into pharmaceutical preparations. They can be brought into customary forms of administration, such as capsules, tablets, dragees or pills, solutions, or emulsions, and they may also be placed into the body in depot forms. The preparation of these customary composition forms is effected by mixing the active substances with common and known pharmaceutical adjuvants which are inert and physiologically acceptable e.g., inert diluents, such as vegetable oils, waxes, fats, ethanol, water, talc, maltose; colloidal silicic acid; bursting agents, such as maize starch or alginic acid; binders, such as starch or gelatin; or means for attaining a depot effect, e.g. carboxymethylcellulose or polyvinyl acetate. There may also be added suitable preservatives, flavorings and sweeteners, and colorants, if desired.

The liquid forms of application of the acting substances for oral administration may particularly contain sweetening agents, such as glycerin, or taste-improving agents, such as vanillin or citrus extracts. They may also contain solubilizers or emulsifiers such as surfactants, e.g. Tween, viz polyoxyethylene-sorbitan-monolaurate, -monopalmitate, -monostearate, -monooleate, -trioleate, etc.

The capsules containing the active substances may be produced, e.g., in such a manner that such active substance is dissolved in vegetable oil and filled into soft gelatin capsules in accordance with the Scherer process. For preparation of the tablet form, the active substance can be mixed with colloidal silicic acid or the like and pressed into tablet cores in a known manner, which cores in a given case can, if desired, be sugar-coated or covered with a film of resin.

Since the choleretic compounds used until the present time in the pharmaceutical field belong to completely different classes of chemical compounds, it could not have been expected that the phenol ether compounds of the present invention possess such a strong choleretic effect.

The following three compounds: 3-butoxy-1 - phenoxypropanol-(2); 3 - isopropoxy - 1 - (4'-methoxyphenoxy)-propanol-(2) and 3-ethoxy - 1 - (3'-methylphenoxy)-propanol-(2) have been found to be particularly effective, while possessing at the same time a good tolerance.

The preparation of the effective substances of the invention is given below by means of examples. The preparation of a few medicinal preparations suitable for medicinal practice is also set forth in this connection. These examples are illustrative, and those skilled in the art will be able to make and use other examples.

EXAMPLE 1

3-isopropoxy-1-(4'-methoxyphenoxy)-propanol-(2)

The active substance having the formula

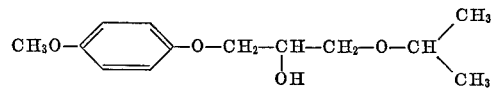

was manufactured in such a manner that, initially, in a 500 ml. four-neck flask equipped with stirrer, intensive cooler, dropping funnel and feed pipe for the gas treatment with nitrogen, there was dissolved 14.6 g. (0.26 mole) of pulverized caustic potash in 150 ml. isopropanol, whereafter 30.5 g. (0.2 mole) of 3-isopropoxy-1-chloropropanol-(2) was added thereto dropwise. The glycidyl ether formed while potassium chloride precipitated. The material was stirred for such a time, about 2 hours, until the starting product could no longer be determined, e.g., by gas chromatography.

Next, 27.3 g. (0.22 mole) hydroquinone monomethylether dissolved in 120 ml. isopropanol was added to the solution of the glycidyl ether. Under bubbling nitrogen, the material was heated slowly to boiling and was then boiled under reflux until the gas-chromatographic control indicated an optimal conversion, approximately after 6 hours. After the suspension was cooled under nitrogen, the solvent was distilled off under vacuum. The residue was taken up in 200 ml. water and the milky emulsion extracted exhaustively with ether. From the organic phase, the excess hydroquinone monomethyl ether was extracted with diluted potassium hydroxide solution. The ether phase was washed neutral with water and the solvent removed after drying with sodium sulfate. The remaining oily residue was distilled under vacuum; there was obtained a colorless liquid having boiling point 137° C./0.06 mm.

Yield: 35.0 g.=72.9% of the theory.

The following mixture was employed for the preparation of soft gelatin capsules:

|  | Mg. |
|---|---|
| 3-isopropoxy - 1 - (4'-methoxyphenoxy)-propanol-(2) | 100.0 |
| Vegetable oil | 300.0 |
| Wax | 50.0 |
| Soy lecithin | 3.0 |
| | 453.0 |

In this connection, the active substance, together with the two other additives, was dissolved in the vegetable oil, e.g. a triglyceride mixture of saturated, average-chain length fatty acids and the mixture was filled into oval capsules (7.5) at 0.462 ml. content, in accordance with the Scherer process.

EXAMPLE 2

3-n-butoxy-1-phenoxy-propanol-(2)

The active substance having the formula

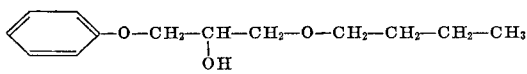

was produced in such a manner that, initially, 4.5 g. (0.08 mole) pulverized potassium hydroxide was dissolved in 300 ml. isopropanol. Then, 52.0 g. (0.4 mole) n-butylglycidyl ether and 41.4 g. (0.44 mole) phenol was added thereto, whereafter the material was heated to boiling under nitrogen. The material was stirred, about 8.5 hours, until no glycidyl ether could be determined, e.g., by gas chromatography. The further processing was performed as in Example 1, in which connection there was obtained a colorless liquid of boiling point 123.5° C./0.07 mm.

Yield: 81.8 g. (91.1% of the theory).

For the preparation of dragees that each contain

|  | Mg. |
|---|---|
| 3-n-butoxy-1-phenoxy-propanol-(2) | 50.0 |
| Cellulose powder | 150.0 |
| Colloidal silicic acid | 46.5 |
| Magnesium stearate | 6.0 | and powdered sugar sufficient to provide a total of 300.0 mg. there was prepared first of all a uniform mixture from 50 kg. active substance, 45.0 kg. silicic acid, 150 kg. cellulose powder and 55 kg. powdered sugar, which mixture was granulated. The granulate was further mixed with 1.5 kg. silicic acid and 6 kg. magnesium stearate and pressed into dragee cores having a weight of 300.0 mg. (diameter 9 mm.). The cores can be coated or covered in a customary manner by means of titanium dioxide, calcium carbonate, yellow and orange lacquer, talcum and molasses.

EXAMPLE 3

1-(3',5'-dimethylphenoxy)-3-methoxy-propanol-(2)

To a solution of 20.8 g. (0.37 mole) caustic potash in 250 ml. isopropanol, there is added 37.4 g. (0.30 mole) 3-methoxy-1-chloropropanol-(2) under nitrogen and ice cooling. While potassium chloride precipitates, the material is stirred subsequently at room temperature for such a time, about 2 hours, until no starting compound can be determined, e.g. by gas chromatography.

After 40.3 g. (0.33 mole) 3,5-dimethylphenol is added to the solution of the glycidyl ether, the reactive mixture is heated in nitrogen atmosphere for 7 hours under reflux. After cooling, the solvent is removed under vacuum and the residue is taken up into ether. The ether solution is then extracted five times with 32 ml. 2 N potash lye in each case for the purpose of removing the excess 3,5-dimethylphenol; the solution is then washed neutral with water and the solvent is removed after drying over sodium sulfate. The vacuum distillation of the remaining residue produces a colorless liquid with boiling point 127° C./0.09 mm.

Yield: 46.4 g. (73.6% of the theory).

EXAMPLE 4

1-(3',5'-dimethylphenoxy)-3-ethoxy-propanol-(2)

In a manner similar to that of Example 1, ethylglycidyl ether is produced initially from 41.6 g. (0.3 mole) 3-ethoxy-1-chloropropanol-(2), 21.8 g. (0.39 mole) pulverized potassium hydroxide and 300 ml. isopropanol. Subsequently the ethylglycidyl ether, together with a solution of 40.3 g. (0.33 mole) 3,5-dimethylphenol in 50 ml. isopropanol, is heated in nitrogen atmosphere for 10 hours under reflux. The further processing is carried out as in Example 1; there is obtained a colorless liquid having a boiling point of 121° C./0.2 mm.

Yield: 54.2 g. (80.5% of the theory).

EXAMPLE 5

1-(3',5'-dimethoxyphenoxy)-3-methoxy-propanol-(2)

In accordance with Example 1, 16.6 g. (0.13 mole) 3-methoxy-1-chloropropanol-(2) is converted initially into the corresponding glycidyl ether by means of 7.48 g. (0.13 mole) of pulverized potassium hydroxide and 140 ml. isopropanol, by stirring for 4 hours at room temperature. To the glycidyl ether, there is added dropwise 30.8 g. (0.2 mole) phloroglucinol dimethyl ether, dissolved in 80 ml. isopropanol, and the material is heated for 11 hours in nitrogen atmosphere under reflux. The further treatment is carried out as in Example 1; there is obtained a colorless liquid of boiling point 147° C./0.05 mm.

Yield: 16.7 g. (51.8% of the theory).

EXAMPLE 6

1-(4'-fluorophenoxy)-3-n-butoxy-propanol-(2)

Initially, 3.92 g. (0.07 mole) pulverized potassium hydroxide is suspended in 300 ml. benzene. To this suspension there is added in nitrogen atmosphere first 37.4 (0.33 mole) 4-fluorophenol and, finally, 39.0 g. (0.3 mole) n-butylglycidyl ether and the material is heated for such a time, about 11.5 hours, until no glycidyl ether can be determined, e.g. by thin layer chromatography. Further processing is effected as in Example 1; there is obtained a colorless liquid of boiling point 124° C./0.07 mm.

Yield: 64.6 g. (89.0% of the theory).

EXAMPLE 7

1-(3'-methyl-4'-chlorophenoxy)-3-methoxy-propanol-(2)

In accordance with Example 1, the glycidyl ether is produced first from 37.4 g. (0.3 mole) 3-methoxy-1-chloropropanol-(2), 21.8 g. (0.39 mole) pulverized potassium hydroxide and 300 ml. isopropanol. Subsequently, the glycidyl ether, together with a solution of 47.1 g. (0.33 mole) 4-chloro-3-methylphenol in 50 ml. isopropanol, is heated in nitrogen atmosphere under reflux for such a time, about 10 hours, until no glycidyl ether can be determined by gas chromatography. The further treatment is carried as in Example 1; there is obtained a colorless liquid having a boiling point of 124° C./0.6 mm.

Yield: 36.8 g. (53.1% of the theory).

EXAMPLE 8

1-(4'-fluorophenoxy)-3-allyloxy-propanol-(2)

In accordance with the procedure of Example 4, into the suspension of 3.5 g. (0.062 moles) of pulverized potassium hydroxide in 330 ml. benzene, there is introduced under inert gas atmosphere first 49.4 g. (0.44 mole) 4-fluorophenol and then 45.7 g. (0.4 mole) allylglycidyl ether. After boiling for 8 hours under reflux, no glycidyl ether can be determined in the reactive mixture by gas chromatography. The further treatment is carried out as in Example 1; there is obtained a colorless liquid of boiling point 80°C./0.03 mm. (molecular distillation laboratory apparatus KDL 1).

Yield: 65.0 g. (71.6% of the theory).

EXAMPLE 9

For the preparation of soft gelatin capsules, the active substance having the formula

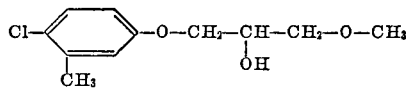

was employed in the following mixture:

|  | Mg. |
|---|---|
| 1-(3'-methyl-4'-chlorophenoxy)-3-methoxy-propanol-(2) | 100.0 |
| Vegetable oil | 300.0 |
| Wax mixture | 50.0 |
| Soy lecithin | 3.0 |
|  | 453.0 |

The effective substance, together with the two other additives was here dissolved in the vegetable oil, a triglyceride mixture of saturated, average-chain fatty acids, and the mixture was filled into oval capsules (7.5) at 0.462 ml. content according to the Scherer process.

EXAMPLE 10

The effective substance having the formula

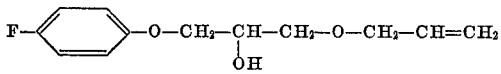

was processed further in the following manner for the preparation of dragees that each contain:

|  | Mg. |
|---|---|
| 1-(4'-fluorophenoxy)-3-allyloxy-propanol-(2) | 50.0 |
| Cellulose powder | 150.0 |
| Colloidal silicic acid | 46.5 |
| Magnesium stearate | 6.0 | and powdered sugar in an amount to provide a total of 300.0 mg. A uniform granulated mixture was prepared from 50 kg. effective substance, 45 kg. silicic acid, 150 kg. cellulose powder and 55 kg. powdered sugar. The granulate was further mixed with 1.5 kg. silicic acid and 6 kg. magnesium stearate and molded into dragee cores weighing 300.0 mg. (diameter 9 mm.). The cores can be coated or covered in a customary manner by means of titanium dioxide, calcium carbonate, yellow and orange lacquer, talcum and molasses.

It is to be understood that the invention is not limited to the embodiments which are illustratively offered, and that modifications may be made without departing from the invention.

What is claimed is:

1. A method for effecting increased bile flow comprising orally administering to a patient in need of a choleretic effective amount of 10–200 mg. of a compound of the formula

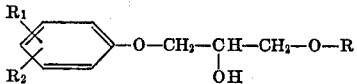

wherein R is lower alkyl or alkylene radical of 1–4 carbon atoms and $R_1$ and $R_2$ are each selected from the group consisting of hydrogen, methyl, trifluoromethyl, methoxy, ethoxy, chlorine and fluorine.

2. A method in accordance with claim 1 wherein said compound is 3-butoxy-1-phenoxy-propanol-(2); 3-isopropoxy-1-(4'-methoxyphenoxy)-propanol-(2); or 3-ethoxy-1-(3'-methylphenoxy)-propanol-(2).

References Cited

UNITED STATES PATENTS

| 2,343,053 | 2/1944 | Grun | 260—615 |
| 2,868,843 | 1/1959 | Moyle | 424—340 |
| 3,592,923 | 7/1971 | Vaille | 424—340 |

ALBERT T. MEYERS, Primary Examiner

D. M. STEPHENS, Assistant Examiner

U.S. Cl. X.R.

424—340